United States Patent
Parolini et al.

(10) Patent No.: US 10,150,188 B1
(45) Date of Patent: Dec. 11, 2018

(54) METHOD OF CERAMIC MATRIX COMPOSITE REPAIR

(71) Applicant: GENERAL ELECTRIC COMPANY, Schenectady, NY (US)

(72) Inventors: Jason Robert Parolini, Anderson, SC (US); James Joseph Murray, Piedmont, SC (US); Matthew Troy Hafner, Honea Path, SC (US); Canan Uslu Hardwicke, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/668,993

(22) Filed: Aug. 4, 2017

(51) Int. Cl.
| | | |
|---|---|---|
| B05D 3/02 | (2006.01) | |
| B05D 5/00 | (2006.01) | |
| B22F 3/26 | (2006.01) | |
| B23P 6/04 | (2006.01) | |
| C23C 6/00 | (2006.01) | |
| C04B 35/14 | (2006.01) | |
| C23C 26/02 | (2006.01) | |
| C04B 35/565 | (2006.01) | |
| C04B 35/653 | (2006.01) | |

(52) U.S. Cl.
CPC .............. B23P 6/04 (2013.01); B05D 3/0254 (2013.01); B05D 5/005 (2013.01); B22F 3/26 (2013.01); C04B 35/14 (2013.01); C04B 35/565 (2013.01); C04B 35/653 (2013.01); C23C 6/00 (2013.01); C23C 26/02 (2013.01); B05D 2203/30 (2013.01); B05D 2401/30 (2013.01)

(58) Field of Classification Search
CPC ............ C23C 6/00; C23C 26/02; C04B 35/14; C04B 35/565; C04B 35/653; B23P 6/04; B05D 3/0254; B05D 5/005; B05D 2203/30; B05D 2401/30
USPC ........ 29/402.01, 402.18; 427/140, 375, 376.2
See application file for complete search history.

(56) References Cited

U.S. PATENT DOCUMENTS

| | | | |
|---|---|---|---|
| 5,628,938 A | 5/1997 | Sangeeta et al. | |
| 6,820,334 B2 | 11/2004 | Kebbede et al. | |
| 7,686,990 B2 | 3/2010 | Gray | |
| 8,043,720 B2 | 10/2011 | Corman et al. | |
| 2003/0196305 A1 * | 10/2003 | Kebbede ................. | B23P 6/005 29/402.11 |

(Continued)

FOREIGN PATENT DOCUMENTS

| | | | | |
|---|---|---|---|---|
| CA | 2107422 A1 * | 4/1994 | ........... | C04B 37/003 |
| CA | 2107422 A1 | 4/1994 | | |

*Primary Examiner* — William P Fletcher, III
(74) *Attorney, Agent, or Firm* — Ernest G. Cusick; Frank A. Landgraff

(57) ABSTRACT

A method of treating a ceramic matrix composite article, including selecting an article having a ceramic composition formed by a process comprising an initial melt infiltration at an initial temperature with an initial infiltration material, whereby said article has at least one treatable feature. A portion of the ceramic composite is removed from a region abutting the treatable feature to form a treatment region. A treatment material including a reinforcing fiber is positioned in the treatment region and densified by a first melt infiltration with a first infiltration material including silicon. The first melt infiltration is performed at a first temperature lower than the initial infiltration temperature of the initial melt infiltration.

19 Claims, 5 Drawing Sheets

(56) References Cited

U.S. PATENT DOCUMENTS

2013/0022471 A1* 1/2013 Roberts, III ............ F01D 5/005
 416/229 R

* cited by examiner

METHOD OF CERAMIC MATRIX COMPOSITE REPAIR

FIELD OF THE INVENTION

The present invention is directed to a method of treating ceramic matrix composite articles. More particularly, the invention is directed to the repair of surface features in ceramic matrix composite parts.

BACKGROUND OF THE INVENTION

Ceramic matrix composite components, are frequently utilized in extreme environments where they are exposed to a variety of thermomechanical and environmentally related damage and wear mechanisms, including: erosion due to impact by high velocity and high temperature airborne particles, high temperature oxidation, volatilization, and recession in turbine environments, low-cycle fatigue processes and mechanical abrasion caused by rubbing against other members. These mechanisms are known to cause cracking, pitting, delaminations, and other damage to the components. Because the manufacturing costs for ceramic matrix composite components are typically relatively high, it is often desirable to repair a damaged or worn component rather than replace it.

BRIEF DESCRIPTION OF THE INVENTION

In an embodiment, a method of treating a ceramic matrix composite article, including selecting an article, the article having a ceramic composition, and the article formed by a process comprising an initial melt infiltration at an initial temperature with an initial infiltration material, whereby said article has at least one treatable feature. The method also includes removing a ceramic composite from a region abutting a portion of the at least one treatable feature to form a treatment region. The method also includes positioning a treatment material including a reinforcing fiber into the treatment region and densifying at least a portion of the treatment material by a first melt infiltration with a first infiltration material, wherein the first infiltration material includes silicon, and wherein the first melt infiltration is performed at a first temperature lower than the initial infiltration temperature of the initial melt infiltration.

In another embodiment, a method of treating a ceramic matrix composite article, including selecting an article having a ceramic composition, whereby said article has at least one treatable feature. The method also includes, removing a ceramic composite from a region abutting a portion of the at least one treatable feature to form a treatment region. The method also includes depositing a treatment material, including a slurry further including a reinforcing fiber, a matrix material, and a carrier material and densifying at least a portion of the treatment material by a first melt infiltration, at a first temperature, with a first infiltration material, wherein the first infiltration material includes silicon and between 0.1 atomic percent and 8 atomic percent boron.

Other features and advantages of the present invention will be apparent from the following more detailed description, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided is a method of repairing a ceramic matrix composite article. Embodiments of the present disclosure, for example, in comparison to concepts failing to include one or more of the features disclosed herein, result in the ability to repair ceramic matrix composite articles while preventing the outflow of silicon, especially residual metallic silicon in the form of interconnected silicon veins and/or pools.

Figure 1:
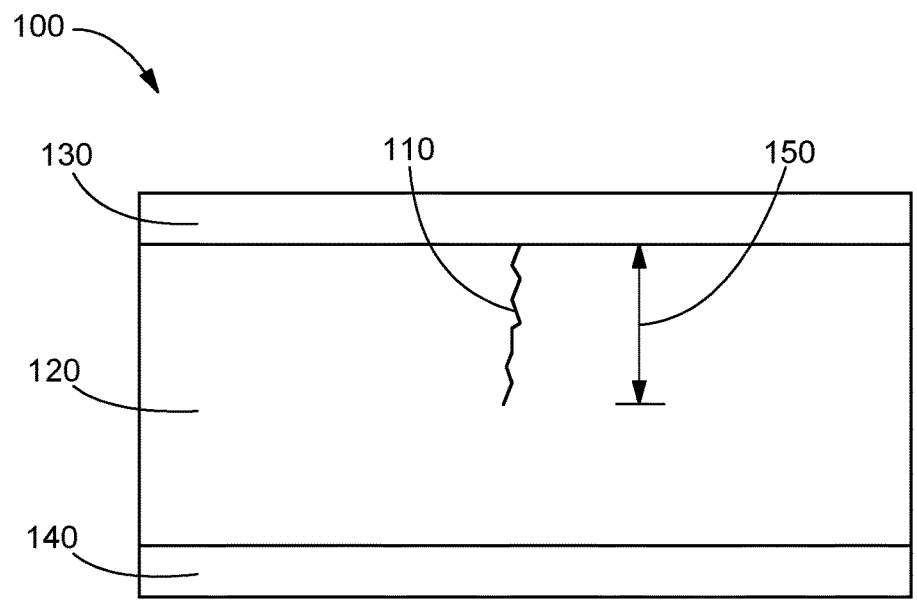
FIG. 1 is a side view of a ceramic matrix composite article according to an embodiment.

In the example of FIG. 1, a ceramic composite article 100 (e.g., turbine shroud, turbine nozzle, turbine blade, combustor tile, and/or combustion liner) includes a ceramic composite 120 having a first surface 130, a second surface 140 opposed to the first surface 130, and at least one treatable feature 110 extending from a location on or near the first surface 130 a depth 150 in the direction of the second surface 140. The ceramic composite 120 may include one or more reinforcing fibers (e.g., silicon carbide (SiC), mullite, silicon nitride ($Si_3N_4$), alumina ($Al_2O_3$), aluminum nitride (AlN), titanium boride ($TiB_2$), titanium nitride (TiN), titanium carbide (TiC), boron carbide ($B_4C$), and combinations thereof) and a ceramic matrix (e.g., silicon carbide (SiC), mullite, silicon nitride ($Si_3N_4$), alumina ($Al_2O_3$), aluminum nitride (AlN), titanium boride ($TiB_2$), titanium nitride (TiN), titanium carbide (TiC), boron carbide ($B_4C$), and combinations thereof).

In some embodiments, the one or more fibers may exhibit an operating temperature above 1200 degrees Celsius and/or a melting temperature above 1700 degrees Celsius. In some embodiments, the one or more reinforcing fibers may include the same material as the ceramic matrix. In some embodiments, the treatable feature 110 may extend a portion of a distance from the first surface 130 to the second surface 140. In some embodiments, the depth 150 of the treatable feature 110 may extend the entire distance from the first surface 130 to the second surface 140. In some embodiments, the depth 150 of the treatable feature 110 may extend at least 25 percent, at least 40 percent, at least 55 percent, less than 95 percent, less than 90 percent, less than 80 percent, less than 70 percent, and combinations thereof, of the distance 150 between the first surface 130 and the second surface 140. In some embodiments, the at least one treatable feature 110 may include a crack, recession pitting, subsurface delamination, void, porosity, spall or other defect. In some embodiments, the at least one treatable feature may be a structural defect. In some embodiments, the at least one treatable feature may be a cosmetic defect. In some embodiments, the at least one treatable feature may include both a structural defect and a cosmetic defect.

Figure 2:
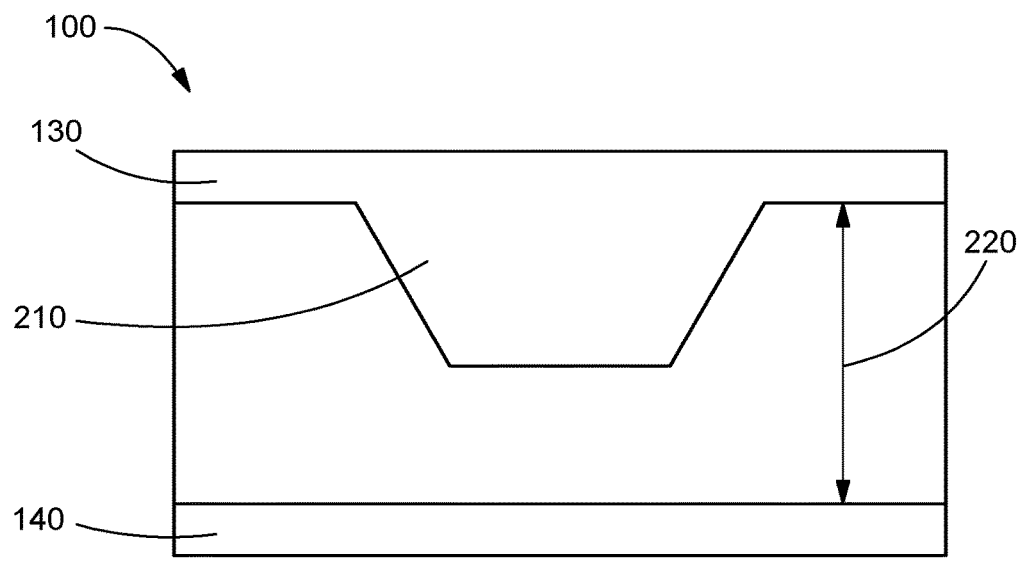
FIG. 2 is a side view of a ceramic matrix composite article according to an embodiment.

In the example of FIG. 1, a portion of the ceramic composite 120 abutting the treatable feature 110 may be removed to form a treatment region 210 as shown in FIG. 2. The removal of the ceramic composite 120 may also remove substantially all the foreign material present within the treatment region 210. In some embodiments, the treatment region 210 may taper from the first surface 130 toward the second surface 140. In some embodiments, the treatment region 210 may extend at least about 10 percent, at least 25 percent, at least 40 percent, at least 55 percent, at least 75 percent, about 100 percent, less than 95 percent, less than 90 percent, less than 80 percent, less than 70 percent, less than 50 percent, and combinations thereof, of the distance 220 between the first surface 130 and the second surface 140.

Techniques for removing the portion of the ceramic composite 120 include electrochemical machining, electrode discharge machining, mechanical grinding, grit blasting, laser ablation, water jet, and combinations thereof.

Figure 3:
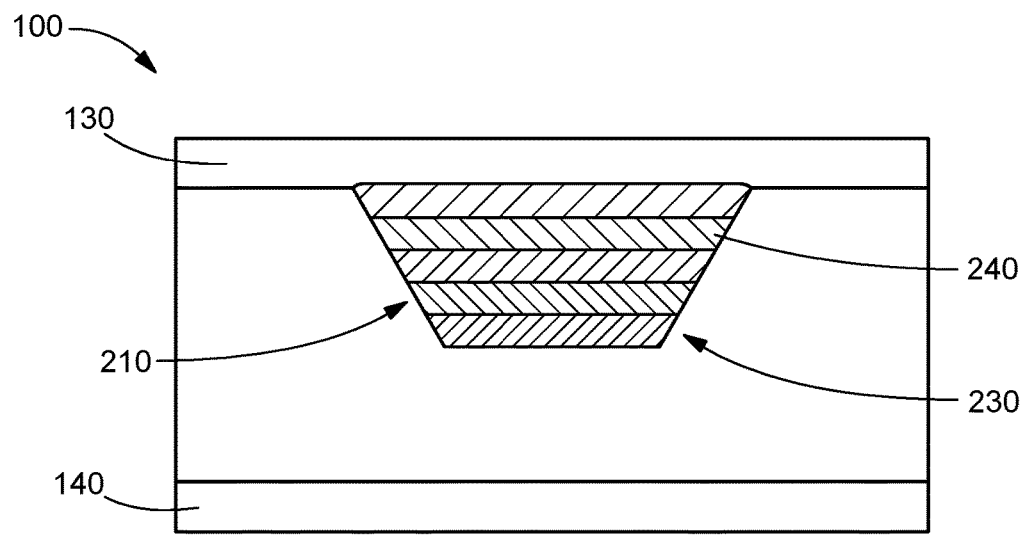
FIG. 3 is a side view of a ceramic matrix composite article according to an embodiment.

A treatment material 230 may be positioned within the treatment region 210. An embodiment of the ceramic composite article 100 including the treatment material 230 is shown in FIG. 3. In some embodiments, the treatment material 230 includes one or more layers of a tape 240 having one or more reinforcing fibers (e.g., unidirectional fibers, unidirectional tows, unidirectional rovings, and/or woven fibers), and at least one matrix material including at least one of a ceramic matrix material, and/or a ceramic matrix material precursor (e.g., carbon).

The reinforcing fibers of the one or more layers of the tape may be aligned in the same or different directions (e.g., 0 degrees, 30 degrees, 45 degrees, 60 degrees, 90 degrees, −30 degrees, −45 degrees, −60 degrees, and combinations thereof). In an embodiment, the tape includes a plurality of layers in which the reinforcing fibers are aligned at 0 degrees, −45 degrees, 45 degrees, and 90 degrees. In an embodiment, the tape includes one or more layers in which the reinforcing fibers are aligned in an orientation corresponding to the reinforcing fibers of the ceramic composite 120.

Figure 4:
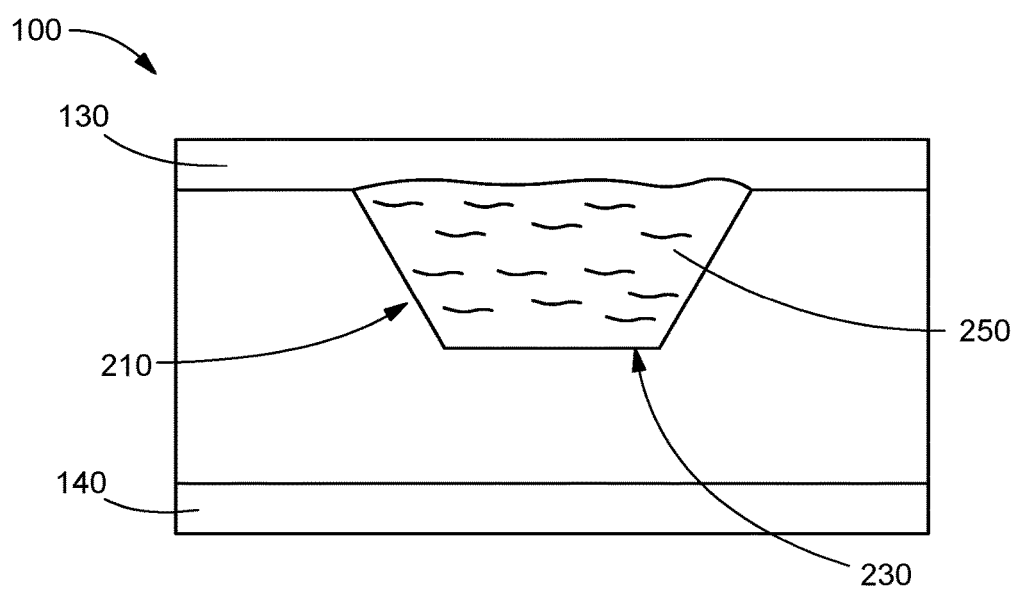
FIG. 4 is a side view of a ceramic matrix composite article according to an embodiment.

In an alternate embodiment, the treatment material 230 may be provided to the treatment region 210 in the form of a slurry 250. In some embodiments, the slurry 250 includes at least one carrier material (e.g., isopropanol, ethanol, methanol, deionized water, tertiary butyl alcohol, p-xylene, carbon tetrachloride, cyclohexane, polymer resin, and/or gel inorganics), at least one matrix material including at least one of a ceramic matrix material, and/or a ceramic matrix material precursor (e.g., furfuryl alcohol), and one or more reinforcing fibers (e.g., nonwoven fibers, chopped fibers, and/or felted fibers). In an embodiment, the carrier material may be removed by room temperature evaporation or a thermal cycle. In an embodiment, the carrier material may be removed by freeze drying. In an embodiment, the carrier material may be carbonized. An embodiment of the ceramic composite article 100 including the treatment material 230 as a slurry 250 is shown in FIG. 4.

In an alternate embodiment, the treatment material 230 may be provided to the treatment region 210 as a combination of one or more layers of the tape 240 in combination with the slurry 250.

In some embodiments, the one or more reinforcing fibers may further include one or more coatings. In an embodiment, the one or more reinforcing fibers includes a boron nitride coating. In one embodiment, the one or more coated fibers includes a silicon doped boron nitride coating. In an embodiment, the one or more coated fibers includes a silicon nitride coating. In one embodiment, the one or more coated fibers includes a boron nitride or silicon doped boron nitride coating and a silicon nitride overcoating. In one embodiment, the one or more coated fibers includes a boron nitride or silicon doped boron nitride coating, a silicon nitride coating, and at least one carbon coating. In one embodiment, the one or more coated fibers includes a boron nitride or silicon doped boron nitride coating, a carbon coating, a silicon nitride coating, and a carbon overcoating.

In some embodiments, the treatment material 230 may include reinforcing fibers which are the same as the reinforcing fibers of the ceramic matrix 120. In some embodiments, the treatment material 230 may include at least one matrix material including a ceramic material which is the same as the ceramic matrix of the ceramic composite 120.

Figure 5:
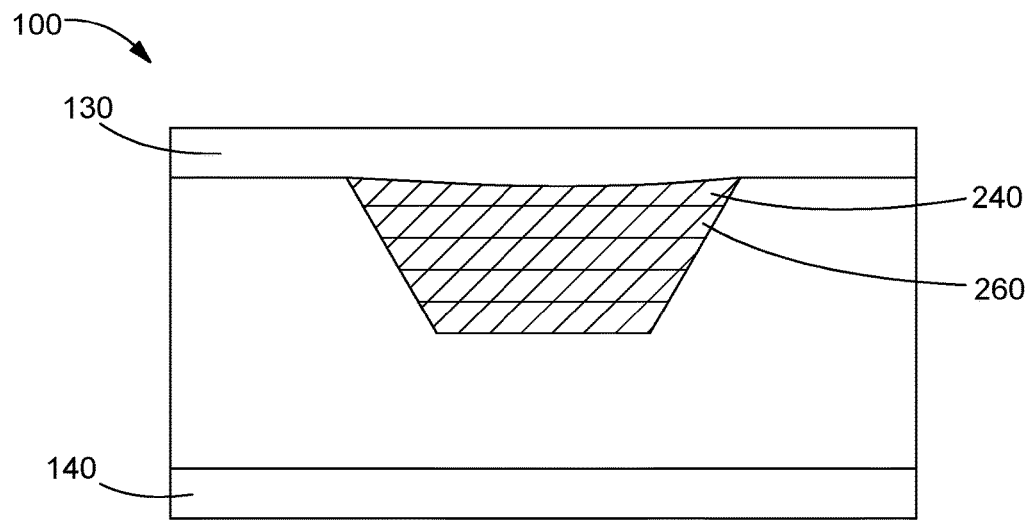
FIG. 5 is a side view of a ceramic matrix composite article according to an embodiment.
Figure 6:
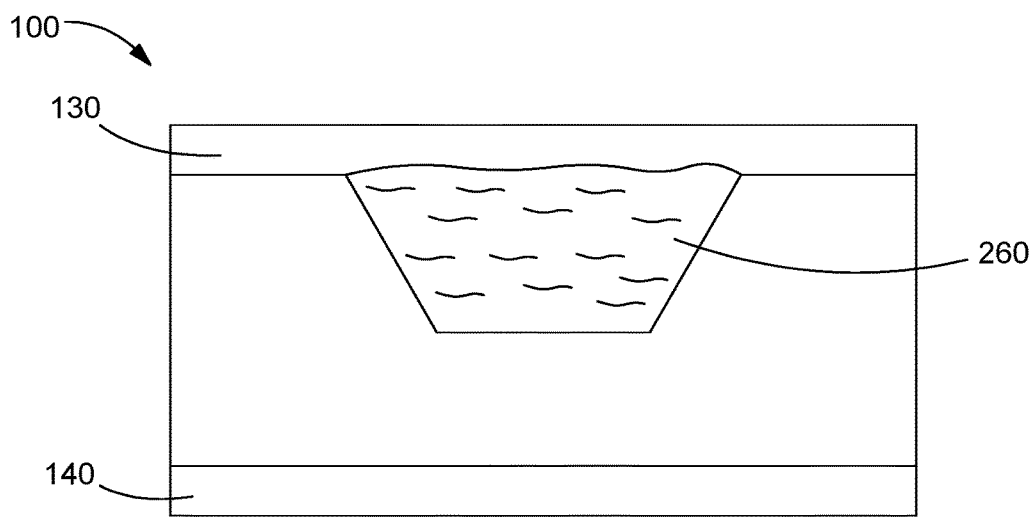
FIG. 6 is a side view of a ceramic matrix composite article according to an embodiment.

In the examples of FIGS. 3 and 4, the treatment material 230 of the treatment region 210 may be densified by the addition of an infiltration material 260, not shown in FIGS. 3 and 4. The infiltration material 260 may include at least one of a ceramic matrix material and/or a reactive ceramic matrix material precursor. In some embodiments, the infiltration material 260 includes the reactive ceramic matrix material precursor which reacts with the ceramic matrix material precursor of the treatment material 230 to form a ceramic matrix material. FIGS. 5 and 6 illustrate the examples of FIGS. 3 and 4 after densification.

During the manufacture of a typical melt infiltrated silicon containing ceramic composite (e.g., SiC—SiC), the infiltration process uses molten silicon as the melt infiltrant resulting in the formation of silicon carbide within the ceramic matrix 120. During melt infiltration areas of unreacted silicon may form. These silicon rich areas, sometimes referred to as silicon veins or pools, can re-melt and produce voids if the part is subjected to additional melt infiltration cycles at temperatures above the melting point of silicon. During the initial manufacture of the ceramic composite article 100 densification may be performed using melt infiltration of substantially pure molten silicon. In some embodiments, the temperature of the molten silicon may be at least the melting temperature of silicon (1414 degrees Celsius). In some embodiments, the silicon may be superheated during the initial melt infiltration. In order to prevent melting (liquification) and potential outflow of silicon from the ceramic matrix 120, during the treatment process, the addition of the infiltration material 260 may be conducted at a temperature lower than the melting point of silicon (1414 degrees Celsius).

During the treatment process, the temperature of the melt infiltration step may be less than the melt infiltration temperature of a previous melt infiltration. In some embodiments, the temperature of the current melt infiltration is less than the lowest melt infiltration temperature of any previous melt infiltration. In some embodiments, a plurality of melt infiltrations may have been performed on the ceramic matrix composite article 100 prior to treatment of the at least one treatable feature. In order to prevent melting (liquefaction) and potential outflow of previous infiltration materials (e.g., silicon) the first infiltration temperature may be lower than the lowest infiltration temperature used in the previous melt infiltrations.

In some embodiments, the infiltration process may include a plurality of infiltration steps. In some embodiments, a first infiltration step may be performed at a first infiltration temperature, which is less than the infiltration temperature used during the manufacture of the article. In some embodiments, the first infiltration temperature is at least 10 degrees Celsius, at least 12 degrees Celsius, at least 15 degrees Celsius, at least 20 degrees Celsius, less than 50 degrees Celsius, less than 40 degrees Celsius, less than 30 degrees Celsius, less than 25 degrees Celsius, less than 20 degrees Celsius, and combinations thereof, less than the infiltration temperature used during the manufacture of the article. In one embodiment, the first infiltration temperature is between 1404 degrees Celsius and 1394 degrees Celsius.

In some embodiments, a second infiltration step may be performed at a second infiltration temperature, which is less than the first infiltration temperature. In some embodiments, the second temperature is at least 10 degrees Celsius, at least 12 degrees Celsius, at least 15 degrees Celsius, at least 20 degrees Celsius, less than 50 degrees Celsius, less than 40 degrees Celsius, less than 30 degrees Celsius, less than 25 degrees Celsius, less than 20 degrees Celsius, and combinations thereof, less than the first infiltration temperature.

In some embodiments, a third infiltration step may be performed at a third infiltration temperature, which is less than the second temperature. In some embodiments, the second infiltration temperature is at least 10 degrees Celsius, at least 12 degrees Celsius, at least 15 degrees Celsius, at least 20 degrees Celsius, less than 50 degrees Celsius, less than 40 degrees Celsius, less than 30 degrees Celsius, less than 25 degrees Celsius, less than 20 degrees Celsius, and combinations thereof, less than the second infiltration temperature.

In some embodiments, additional infiltration steps may be performed. In some embodiments, the infiltration temperature of any additional infiltration step will be less than the infiltration temperature of the preceding infiltration step.

In some embodiments, the treatment material includes silicon. In order to provide a silicon source having a melting (liquidus) temperature less than 1414 degrees Celsius small amounts of dopants may be added to the infiltration material 260 to reduce the melting point. In some embodiments, the amount of additional dopants is sufficient to reduce the melting point of the infiltration material 260 by at least 10 degrees Celsius, at least 11 degrees Celsius, at least 15 degrees Celsius, at least 50 degrees Celsius, at least 70 degrees Celsius, at least 90 degrees Celsius, at least 100 degrees Celsius, less than 250 degrees Celsius, less than 200 degrees Celsius, less than about 175 degrees Celsius, less than 150 degrees Celsius, less than 125 degrees Celsius, less than 100 degrees Celsius, less than 80 degrees Celsius, less than 70 degrees Celsius, less than 50 degrees Celsius, less than 30 degrees Celsius, less than 25 degrees Celsius, less than 20 degrees Celsius, less than 18 degrees Celsius, less than 17 degrees Celsius, and combinations thereof.

In some embodiments, a dopant (e.g., aluminum, iron, nickel, cobalt, titanium, calcium, zinc, boron, germanium, antimony, tellurium, and/or tin) may be added to the silicon infiltration material 260 to reduce the melting point. In some embodiments, a plurality of dopants may be added to the silicon infiltration material 260 to reduce the melting point. In some embodiments, boron may be added to the silicon infiltration material 260 to reduce the melting point. In some embodiments, the boron is present in an amount less than about 8 atomic percent, less than about 6 atomic percent, less than about 5 atomic percent, less than about 3 atomic percent, less than about 1 atomic percent, at least about 0.5 atomic percent, at least about 1 atomic percent, at least about 2 atomic percent, at least about 3 atomic percent, and combinations thereof. In some embodiments, nickel may be added to the silicon infiltration material 260 to reduce the melting point. In some embodiments, the nickel is present in an amount less than about 8 atomic percent, less than about 6 atomic percent, less than about 5 atomic percent, less than about 3 atomic percent, less than about 1 atomic percent, at least about 0.5 atomic percent, at least about 1 atomic percent, at least about 2 atomic percent, at least about 3 atomic percent, and combinations thereof.

Figure 7:
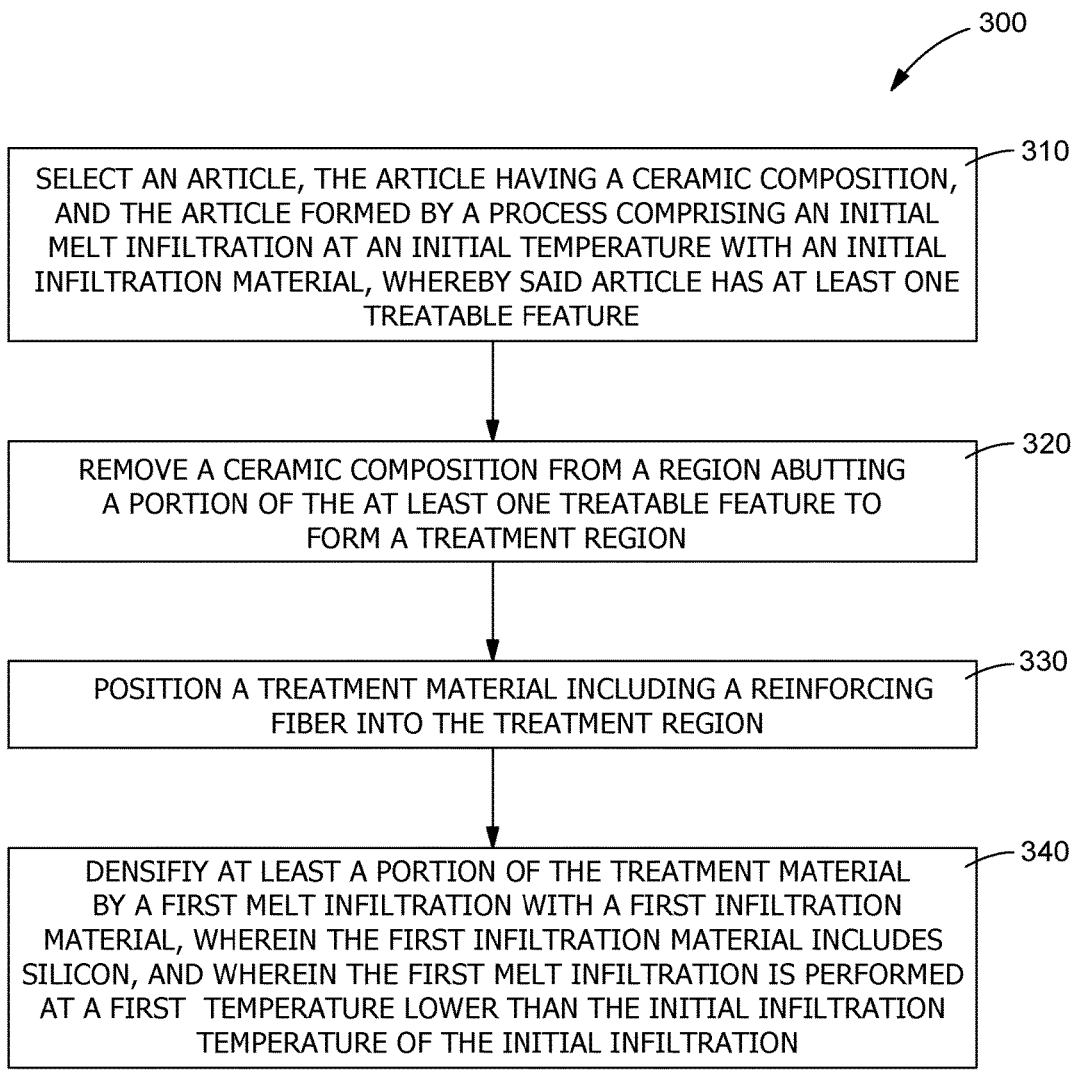
FIG. 7 is a flowchart of a method of repairing a ceramic matrix composite article according to an embodiment.

FIG. 7 is a flowchart of a method 300 of treating the ceramic composite article 100. In the example of FIG. 7, at block 310, select an article, the article having a ceramic composition, and the article formed by a process comprising an initial melt infiltration at an initial temperature with an initial infiltration material, whereby said article has at least one treatable feature. At block 320, remove a ceramic composite from a region abutting a portion of the at least one treatable feature to form a treatment region. At block 330, position a treatment material including a reinforcing fiber into the treatment region. At block 340, densify at least a portion of the treatment material by a first melt infiltration with a first infiltration material, wherein the first infiltration material includes silicon, and wherein the first melt infiltration is performed at a first temperature lower than the initial infiltration temperature of the initial melt infiltration.

Figure 8:
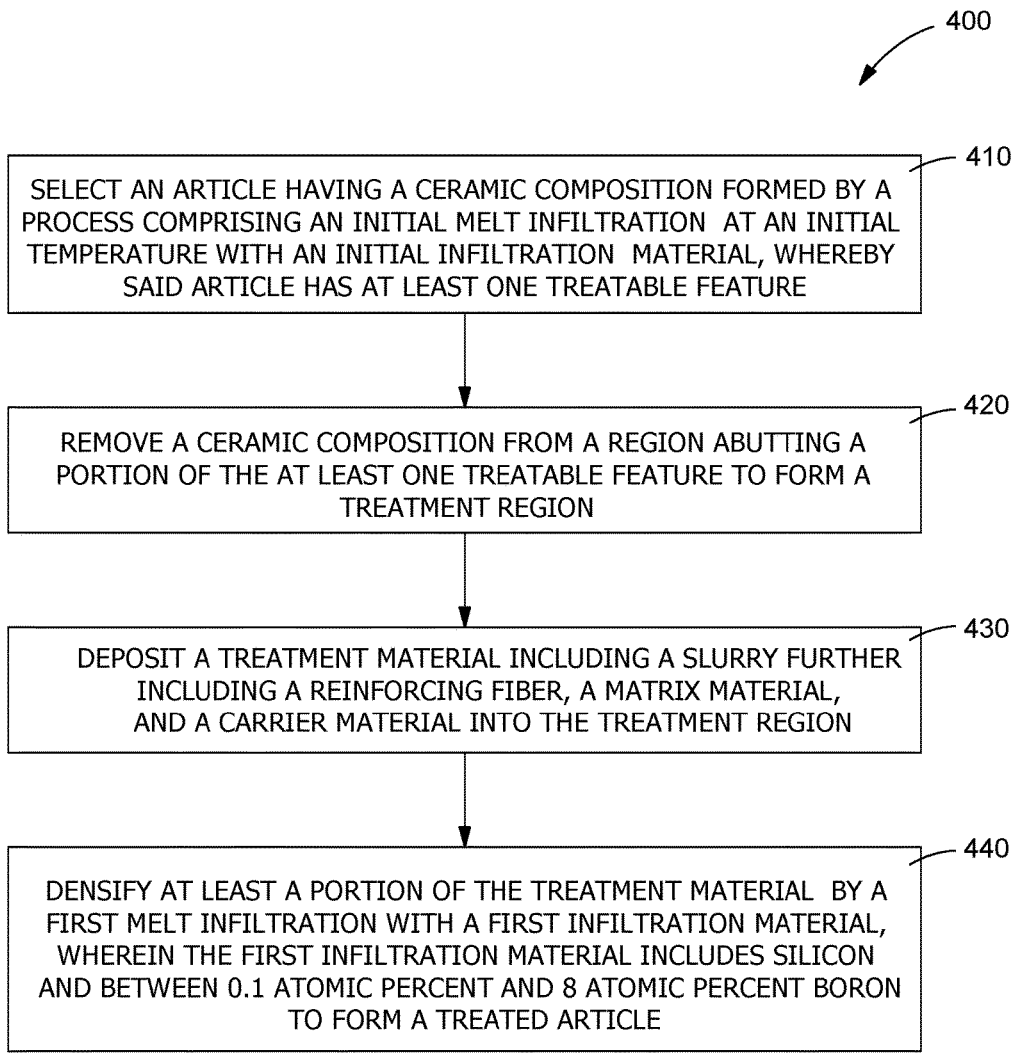
FIG. 8 is a flowchart of a method of repairing a ceramic matrix composite article according to an embodiment.

FIG. 8 is a flowchart of a method 400 of treating the ceramic composite article 100. In the example of FIG. 8, at block 410, select an article having a ceramic composition formed by a process comprising an initial melt infiltration at an initial temperature with an initial infiltration material, whereby said article has at least one treatable feature. At block 420, remove a ceramic composite from a region abutting a portion of the at least one treatable feature to form a treatment region. At block 430, deposit a treatment material, including a slurry further including a reinforcing fiber, a matrix material, and a carrier material into the treatment region. At block 440, densify at least a portion of the treatment material by a first melt infiltration with a first infiltration material, wherein the first infiltration material includes silicon and between 0.1 atomic percent and 8 atomic percent boron to form a treated article.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A method of treating a ceramic matrix composite article, comprising:
    selecting an article, the article having a ceramic composite, and the article formed by a process comprising an initial melt infiltration at an initial temperature with an initial infiltration material, whereby said article has at least one treatable feature;
    removing a portion of the ceramic composite from a region abutting a portion of the at least one treatable feature to form a treatment region;
    positioning a treatment material including a reinforcing fiber into the treatment region;
    densifying at least a portion of the treatment material by a first melt infiltration with a first infiltration material, wherein the first infiltration material includes silicon, and wherein the first melt infiltration is performed at a first temperature lower than the initial infiltration temperature of the initial melt infiltration and lower than a melting point of the initial infiltration material, further comprising densifying at least a portion of the treatment material by a second melt infiltration with a second infiltration material, wherein the second infiltration material includes silicon, and wherein the second melt infiltration is performed at a second temperature lower than the first temperature.

2. The method of claim 1, further comprising densifying at least a portion of the treatment material by a third melt infiltration with a third infiltration material, wherein the third infiltration material includes silicon, and wherein the third melt infiltration is performed at a third temperature lower than the second temperature.

3. The method of claim 1, wherein the first temperature is between 1404 degrees Celsius and 1394 degrees Celsius.

4. The method of claim 1, wherein the first infiltration material further includes boron.

5. The method of claim 1, wherein the reinforcing fiber includes at least one of silicon carbide (SiC), mullite, silicon nitride ($Si_3N_4$), alumina ($Al_2O_3$), aluminum nitride (AlN), titanium boride ($TiB_2$), titanium nitride (TiN), titanium carbide (TiC), or boron carbide ($B_4C$).

6. The method of claim 1, wherein the treatable feature includes at least one of a crack, recession, porosity, or subsurface delamination.

7. The method of claim 1, wherein the treatment material further includes a ceramic matrix material including at least one of silicon carbide (SiC), mullite, silicon nitride ($Si_3N_4$), alumina ($Al_2O_3$), aluminum nitride (AlN), titanium boride ($TiB_2$), titanium nitride (TiN), titanium carbide (TiC), or boron carbide ($B_4C$).

8. The method of claim 1, wherein the treatment material further includes carbon.

9. The method of claim 1, wherein the treatment region extends about 10 percent to about 90 percent of the distance between a first surface of the ceramic composite and a second surface of the ceramic composite opposed to the first surface of the surface composite.

10. The method of claim 1, wherein the treatable feature is on an outermost surface of the article.

11. A method of treating a ceramic matrix composite article, comprising:
selecting an article having a ceramic composite formed by a process comprising an initial melt infiltration at an initial temperature with an initial infiltration material, whereby said article has at least one treatable feature;
removing a portion of the ceramic composite from a region abutting a portion of the at least one treatable feature to form a treatment region;
depositing a treatment material, including a slurry further including a reinforcing fiber, a matrix material, and a carrier material; and
densifying at least a portion of the treatment material by a first melt infiltration, at a first temperature which is lower than a melting point of the initial infiltration material, with a first infiltration material, further comprising densifying at least a portion of the treatment material by a second melt infiltration with a second infiltration material, wherein the second infiltration material includes silicon, and wherein the second melt infiltration is performed at a second temperature lower than the first temperature.

12. The method of claim 11, wherein the reinforcing fiber includes at least one of silicon carbide (SiC), mullite, silicon nitride ($Si_3N_4$), alumina ($Al_2O_3$), aluminum nitride (AlN), titanium boride ($TiB_2$), titanium nitride (TiN), titanium carbide (TiC), or boron carbide ($B_4C$).

13. The method of claim 11, wherein the carrier material includes at least one of deionized water, tertiary butyl alcohol, isopropanol, p-xylene, carbon tetrachloride, or cyclohexane.

14. The method of claim 11, wherein the treatable feature includes at least one of a crack, recession, porosity, or subsurface delamination.

15. The method of claim 11, wherein the ceramic matrix includes at least one of silicon carbide (SiC), mullite, silicon nitride ($Si_3N_4$), alumina ($Al_2O_3$), aluminum nitride (AlN), titanium boride ($TiB_2$), titanium nitride (TiN), titanium carbide (TiC), or boron carbide ($B_4C$).

16. The method of claim 11, wherein the first infiltration material exhibits a melting (liquidus) temperature between 1410 degrees Celsius and 1385 degrees Celsius.

17. The method of claim 11, wherein the treatable feature is on the outermost surface of the article.

18. The method of claim 11, wherein the first infiltration material includes silicon and between 0.1 atomic percent and 8 atomic percent boron.

19. The method of claim 11, further comprising densifying at least a portion of the treatment material by a third melt infiltration with a third infiltration material, wherein the third infiltration material includes silicon, and wherein the third melt infiltration is performed at a third temperature lower than the second temperature.

* * * * *